United States Patent [19]

Levine

[11] 4,117,469

[45] Sep. 26, 1978

[54] COMPUTER ASSISTED DISPLAY PROCESSOR HAVING MEMORY SHARING BY THE COMPUTER AND THE PROCESSOR

[76] Inventor: Michael R. Levine, 3605 Frederick Dr., Ann Arbor, Mich. 48105

[21] Appl. No.: 752,566

[22] Filed: Dec. 20, 1976

[51] Int. Cl.[2] .................................... G06F 3/14

[52] U.S. Cl. .................................... 340/324 AD

[58] Field of Search .................. 340/324 AD, 324 A; 178/30

[56] References Cited

U.S. PATENT DOCUMENTS 3,974,493 8/1976 de Cavaignac et al. ..... 340/324 AD

*Primary Examiner*—Marshall M. Curtis

*Attorney, Agent, or Firm*—Krass & Young

[57] ABSTRACT

A computer terminal employs a CRT display, a microprocessor, and a random access memory which both stores character codes for information to be displayed on the CRT screen and serves as working storage for the processor. To generate a line of text across the display the processor loads a memory address counter with the address of a memory location containing the code for the first character of the line. The counter is incremented in timed relation to the generation of the display and sequentially outputs consecutive memory addresses in which the consecutive character codes forming the line are stored. During the generation of the line the activity of the processor is inhibited. Following generation of the line the processor regains access to the RAM and tends to I/O duties or modifies the display memory contents until it passes control of the RAM back to the address counter for generation of another line of display.

12 Claims, 1 Drawing Figure

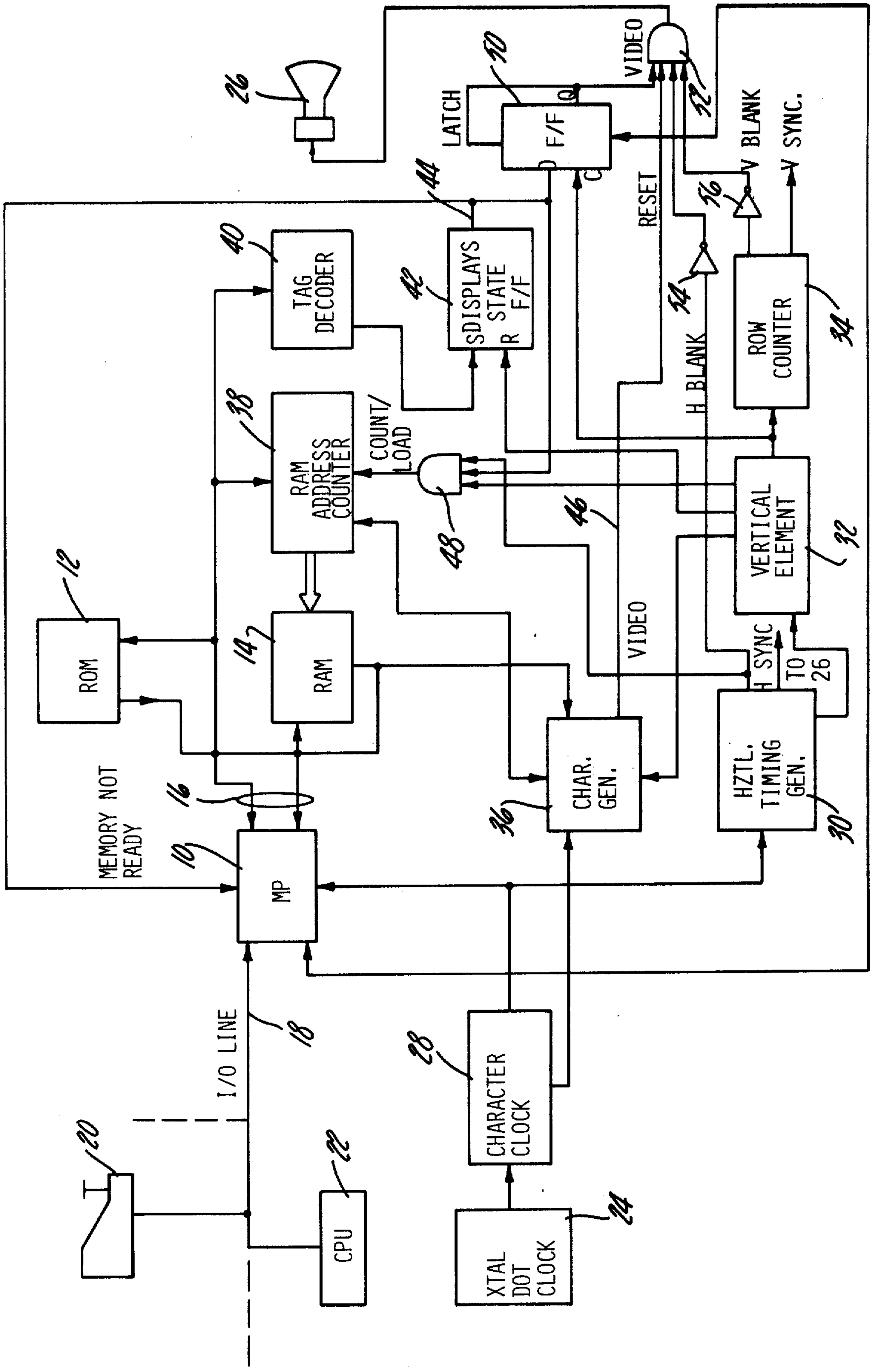
26
VIDEO
50
52
LATCH
F/F
Q
D
C
RESET
V BLANK
V SYNC.
56
44
40
TAG DECODER
42
DISPLAYS STATE F/F
S
R
54
H BLANK
ROW COUNTER
34
38
RAM ADDRESS COUNTER
COUNT/LOAD
48
46
VERTICAL ELEMENT
32
12
ROM
14
RAM
VIDEO
H SYNC
TO 26
CHAR. GEN.
36
HZTL. TIMING GEN.
30
MEMORY NOT READY
16
10
MP
I/O LINE
18
28
CHARACTER CLOCK
20
22
CPU
XTAL DOT CLOCK
24

COMPUTER ASSISTED DISPLAY PROCESSOR HAVING MEMORY SHARING BY THE COMPUTER AND THE PROCESSOR

BACKGROUND OF THE INVENTION

1. Field of the Invention

This invention relates to display processors including refresh memory storage and means for modifying the memory contents under computer control, and more particularly to such a system employing a resident processor which initiates a display segment, and performs display related tasks and also performs communication and editing functions between the generation of display segments.

2. Prior Art

Cathode ray tubes are commonly employed as output or display devices in computer systems. When the common type of low persistence cathode ray tube is employed the display must be repeated, or refreshed, at a relatively high rate to create the visual impression of a continuous display. While it would be technically possible to store the display contents in the computer's random access memory, and to use the computer to select character codes from the memory and to provide them to the display device, this high speed, highly repetitious task would require a large part of the computing capacity of a relatively high speed computer. Accordingly, special purpose "refresh" memories have typically been employed to store the character codes to be displayed on the CRT screen and hardwired circuits have been developed to perform the task of continuously generating the display from this memory, and performing certain auxilliary tasks such as "scrolling" a larger body of text than can be displayed at one instance to provide successive lines of this larger body of text for viewing. These refresh memories and associated hardware have been termed "display processors". They are typically associated with a computer which modifies the refresh memory contents from time to time as required.

The recent development of low cost, integrated circuit, digital numerical micro-processors, has resulted in the substitution of these processors for elaborate logic arrays in a wide variety of digital equipment. The micro-processors can often be programmed to perform a given set of digital functions at a lower cost than building a special purpose logic array of discrete components. The possibility of using a micro-processor as a substitute for the logic in a CRT display processor thus appears superficially attractive, but certain fundamental obstacles limit this substitution. Primarily, the speeds of micro-processors are not sufficient to allow them to perform the entire display generation task and it would be necessary to still provide some discrete digital hardware along with the micro-processor in a display processor system, using the micro-processor to replace only a portion of the processor's discrete logic. This trade-off is of only marginal economic advantage and accordingly micro-processors have been used with, but not as part of display processors.

SUMMARY OF THE INVENTION

The present invention is directed toward a system wherein this marginally advantageous substitution of a micro-processor for some of the discrete logic of a display processor is made, but the coupling of the micro-processor to the system is made in such a way as to free up the processor's capacity during a substantial portion of the time to allow it to perform other processing tasks typically associated with the display processor environment; in particular, those tasks associated with a remote computer terminal having a keyboard and communicating with a central computer as an I/O device. These tasks include editing the refresh memory on the basis of commands received from the CPU or the keyboard, monitoring the activity of the keyboard and encoding keyed signals, and performing the communication protocol with the CPU. Additionally, a micro-processor may be programmed to perform certain computational functions associated with an "intelligent terminal" during that portion of the time when it is not involved in the display cycle.

A central aspect of the present invention relates to the use of a single random access memory as both the refresh memory and as working storage for the micro-processor. While the memory is being used for display purposes the micro-processor cannot gain access to the memory for its other operational tasks, so the present system can be viewed as employing a time sharing system for the random access memory.

In the preferred embodiment of the invention, the micro-processor initiates a display cycle in which a short segment of the total screen is displayed, preferably one line. This is achieved by providing a memory address register that may be incremented in the manner of a counter. The micro-processor generates the memory address of the initial character in the display segment and loads this address into the memory address counter. Increments are added to the counter in timed relation to the display scan to successively address all of the characters in the line, which are stored in consecutive memory locations. This permits the displayed characters to be mapped into minimum RAM space. This is to be contrasted with prior art systems wherein it was common practice to leave empty memory locations to compensate for the fact that the length of a display line was a non-binary value. The addressed character codes are provided to a character generator which outputs video intensity signals for the CRT. A row of text characters is generated by a series of horizontal lines each representing one horizontal slide through the row so the counter must go through its address sequence a number of times to generate a complete row. To accomplish this the micro-processor reloads the initial memory address of the text row into the counter a number of times.

At the end of the generation of a row of the scan the processor again has access to the RAM and can perform editing, I/O, or other computational functions during horizontal or vertical retrace.

If the processor generates the memory address of the initial character of the next display line and provides it to the memory address counter by the time the display scan reaches the point at which that character must be displayed, the next line of display is generated; if, however, the processor does not meet that deadline the display is terminated for the balance of the screen and the processor reinitiates the display when the scan reaches the time for generation of the first character on the next display cycle. This aborting of a portion of the display will result only in minor degradation of the display appearance, typically unnoticeable; however, it allows the processor to gain a relatively large segment of processing time which may be used to perform longer than normal non-display tasks. This novel arrangement effectively sets up a priority system between display and non-display activity of the processor yet maintains the processor activity in synchronism with the asynchronous display scan process.

Because it defines the next memory segment that is displayed on the screen at any time, the processor can readily edit the display on a line-to-line basis without skipping any display period. The processor also monitors the display process to perform such tasks as controlling underlining or blinking of the screen.

The system of the present invention thus couples a micro-processor to a refresh memory and associated display hardware so as to obviate the need for display system elements which would otherwise be required in a discrete display processor system, and in such a manner as to free up the processor for non-display tasks at times which do not degrade the display and additionally allow it to share the random access memory with the display processor.

Other objectives, advantages and applications of the invention will be made apparent by the following detailed description of a preferred embodiment of the invention. The description makes reference to the accompanying drawing which is a partially block, partially schematic diagram of a display processor formed in accordance with the present invention.

The present invention employs a digital processing unit 10. This processor is preferably of the micro-processor type formed on one or more integrated circuit chips. A wide variety of these micro-processors are commercially available and could be employed in connection with the present invention. The preferred embodiment of the invention uses the micro-processor Model 8080 manufactured and marketed by Intel Corporation of Santa Clara, CA. In the appended claims processors of this type will be referred to as "digital, program controlled, numerical processors".

The program for the micro-processor 10 is stored in a read-only memory 12 which is also preferably of the integrated semi-conductor type. Alternatively, the operating program for the micro-processor 10 could be stored in some form of alterable memory.

The system also employs a semi-conductor random access memory 14 which performs the dual function of serving as working memory for the micro-processor 10 and as a refresh memory for the display. As a refresh memory it stores the character codes for at least an entire frame of video data. Preferably the storage area of the random access memory 14 assigned to refresh memory will be substantially larger than that required for storing a single frame, so that additional lines of text may be stored allowing the screen to be scrolled.

The micro-processor 10 has bi-directional communication with the ROM 12 and RAM 14 over an address bus 16 which may consist of both a conventional address and data bus. The processor may specify an address location in the ROM 12 over the data bus to read the code stored therein; similarly it may specify a RAM storage location and either read the code stored therein or write a new code therein.

The micro-processor 10 interconnects to external devices through an I/O line 18. A keyboard 20 and remote central processing unit 22 are illustrated as connected on the I/O line. Other devices, such as cassettes, modems, and printers may also communicate with the processor 10 over the I/O line 18.

In a typical application, the system may form a remote terminal of a large computer system having the central processor 22. The keyboard 20 may be associated with the terminal to allow the operator to provide information to the system.

The timing for the display processor system is derived from a crystal controlled clock 24. The clock outputs pulses at a controlled rate which defines the time required for the horizontal scan of an associated cathode ray tube 26 to traverse a distance which forms the most elementary display element in the system: a dot. The outputs of this dot clock 24 are provided to a dividing counter 28 which provides a single output pulse after eight inputs from the clock 24. These outputs define the number of horizontal dots in a single character to be displayed on a screen; the dividers 28 are therefore termed a "character clock". The output of this character clock is provided to the micro-processor 10 and defines the micro-processor clock cycle. This allows the micro-processor to operate in synchronism with the generation of the video display and avoids the necessity for providing separate circuitry to transform signals from one time base to the other which would be required if separate time bases were provided.

The output of the character clock 28 is also provided to a horizontal timing generator circuit 30. This circuit counts the number of characters contained in one horizontal line across the display, 80 in the preferred embodiment, and generates horizontal synchronization signals for a horizontal timing generator associated with the cathode ray tube 26. The timing generator 30 also generates a horizontal blank signal which defines the horizontal retrace time.

The outputs of the horizontal timing generator 30, which represent the end of a single horizontal line, are provided to a vertical element counter 32. This counter defines the number of vertically aligned dots in a character matrix, as well as the vertical, inter-character spacing. In the preferred embodiment of the invention a character matrix may consist of five horizontal elements and seven vertical elements. The height counts of the character clock 28 allow for three dots of horizontal inter-character spacing. The vertical element counter 32 counts up to ten, which provides the seven vertical dots in a character matrix plus three dots of vertical inter-character spacing.

The vertical element counter 32 provides outputs after each count of 10 to a row counter 34 which counts the number of horizontal rows of characters which make up a total frame, 24 in the preferred embodiment, and generates synchronization signals for a vertical generator associated with the cathode ray tube 26 and vertical blanking signals that define the vertical retrace time. The clock 24, and the divider chains 28, 30, 32 and 34 that receive the outputs of the clock 24, thus control the generation of the raster of the cathode ray tube 26.

The luminance signal for the CRT 26 is derived from a character generator 36, which contains a memory that stores the dot patterns for each of the characters that can be displayed on the CRT 26. A character code fed to the character generator 36 on the data bus 16 controls which matrix is outputted. An output from the vertical element counter 32 determines which horizontal line of the matrix is being outputted, and the signal from the character clock 28 controls the horizontal element in the matrix which is instantaneously outputted.

Considering next the provision of a particular character code to the generator 36, from time-to-time the micro-processor 10, under control of the program in its ROM 12, outputs a signal on the bus 16 which defines an address within the RAM 14, and contains a tag command indicating that the RAM 14 should sequentially output the contents of that memory location, and a series of sequential locations in the RAM, to the character generator 36. This signal will typically appear on the address bus portion of the bus 16. Assuming a 16 bit address command and a 14 bit maximum memory address, 2 bits are available for use as commands which accompany a memory address. This operation is substantially simpler than the prior art techniques of sending a memory address over the address bus and a command over the data bus.

This initial RAM location stores the character code for the first character in one horizontal row across the display. The character codes for the balance of characters in the row are stored at sequential memory locations within the RAM.

This initial memory location is provided to a RAM address counter or buffer 38 and the tag command is provided to a tag decoder 40. On recognizing this display command, the tag decoder 40 provides a signal to a display state flip-flop 42. Flip-flop 42 is set by the leading edge of the display command tag. Previously, flip-flop 42 was in the reset state. When it is set, an output is provided on line 44 to the micro-processor 10 which indicates that the RAM 14 is under the control of the RAM address counter 38. This signal inhibits further activity of the micro-processor 10 and the display command with the address of the memory location of the initial character code of the line to be displayed is maintained on the data bus by the processor. The RAM address counter 38 then controls the memory location within the RAM 14 that is outputted on the data bus to the character generator 36. This character code determines the pattern of dots that is outputted on the video line 46 by the character generator. As successive outputs are provided from the dot clock 24, successive horizontal elements in the matrix are outputted on line 46.

After the dots comprising one horizontal line in a character have been generated, an output from the character clock 28 increments the RAM address counter so that the character code contained in the next consecutive location of the RAM 14 is provided to the character generator 36. This process continues until the first horizontal line of the characters in a horizontal line have been generated. At that point a horizontal blank signal is generated by the horizontal timing generator 30 and provided to an AND gate 48. A second input to the AND gate 48 is derived from the high output of the display state flip-flop 42, on line 44. This indicates that the system is undergoing the display process. The third input to the AND gate 48 is from the vertical element divider 32 indicating that the first seven vertical lines of a row are being processed; the next three vertical lines of a row represent inter-character vertical spacing; and the third input remains low during their occurrence. When all three inputs to the AND gate 48 are high, an output is provided to the RAM address counter which causes it to reload the address of the initial memory location of the line being displayed from the data bus 16. The processor 10 maintains this address on the data bus as long as a high output is provided from the display state flip-flop 44 and the counter 38 is reloaded with this initial address when the output of the gate 48 goes high. When the horizontal blank signal goes low the unit 38 is allowed to count in response to character signals from the clock 28. Accordingly, the same sequence of character codes are again provided to the character generator 38. Since the signal from the vertical element counter 32 has changed, the character generator outputs the second horizontal line in each character code matrix.

This process continues until the vertical element counter 32 provides a count of seven, indicating that all seven horizontal lines of a row of characters have been displayed. The edge of this signal causes the display state flip-flop 42 to reset, removing the high signal on line 44, and allowing the micro-processor to regain access to the RAM 14 and continue its processing. This processing may involve any one of a number of disparate tasks, such as editing the contents of the RAM 14, responding to signals from the CPU 22, or attending to input signals from the keyboard 20 and like devices under control of the program stored in the ROM.

During this non-display time, the divider chain continues its activity, and the three lines of inter-character spacing are generated. At the completion of that time, the vertical element generator 32 provides an output that goes to the clock input of a D flip-flop 50. The data input to that flip-flop is from line 44 representing the high output of the display state flip-flop 42. That flip-flop resets when a count of seven is reached by the vertical element generator 32 and will only be in its set state if the micro-processor has outputted a display command containing the memory address of the character code which begins the next line to be displayed since that reset time. If the output on line 44 is high upon occurrence of a clocking input to the D flip-flop 50 a high output will be provided to an AND gate 52. This AND gate receives the video signals on line 46 as a second input. Two other conditioning inputs come from inverters 54 and 56 which receive the horizontal blank signal from the timing generators 30 and the vertical blank signal from the row counter 34 respectively. Accordingly, as long as there is no horizontal or vertical blank signal and the D flip-flop 50 has a high output, the video signals on line 46 are outputted to the cathode ray tube 26 to generate the display. If the output on line 44 is low when a count of 10 is reached by the vertical element counter 32 a low output will be provided by the flip-flop 50 and this output will be fed back to latch the flip-flop in this state. It will stay in this state, and thus inhibit outputs from the AND gate 52, until it is reset by a vertical blank signal generated by the row counter 34 at the end of the total frame.

Thus, after the display of any row of characters, the micro-processor has three line times in which to perform other processing tasks and to then output the next display command to the RAM address counter. If the micro-processor doesn't meet this deadline, the display is blanked to the end of a frame and the micro processor can use all of that time to perform its other processing tasks. This will involve a slight degradation in the display quality, but if only a portion of one frame is lost it will only result in a hardly noticeable flicker on the screen. The micro-processor can continue to preempt time away from the display process, which will result in more noticeable degradation of the display; however, if the processor is revising the display this simply means a deterioration in the display of obsolete data.

The display processing is thus interleaved with other chores of the micro-processor 10. These non-display tasks may be performed during the generation of the three inter-character lines and during the vertical retrace time without interrupting the continuity of the display processor. If more time is required for a non-display processing task the processor may preempt that time, and access to the RAM, by delaying the generation of a display command.

The micro-processor's operation proceeds in synchronism with the display process because of their use of the common character clock 28. The micro processor also receives the vertical blank signal from the row counter 34. This signal acts as an indication as to the availability of a relatively large inter-display time, and also allows the processor to count frames. It may use the count of frames to control the display by a cursor or a blinking signal. For example, it may generate a cursor by substituting a blank for a cursor indicated character for a predetermined number of display times. The blank character may be provided for thirty consecutive display frames and the regular character for the next sixty. The micro-processor may store the cursored character code during the generation of the blank and later replace it in its proper RAM location.

It is therefore seen that the system of the present invention allows a micro-processor to cooperate in a display process; to perform non-display tasks in synchronism with the continuous display; and to preempt display time for these non-display tasks when required.

The embodiments of the invention in which an exclusive property or privilege is claimed are defined as follows:

1. A display processor, comprising: a digital, program controllable, numerical processor; a display device; means for repeatedly generating a raster of scans of the display device; a random access memory connected to the digital processor and to the display device; a memory address counter connected to the memory and operative to specify the address of a memory location the contents of which are to be provided to the display device; a control program for the digital processor operative to define a plurality of operations to be performed by the processor including the operation of loading into the memory address counter the initial memory address of the first of a series of character codes stored in contiguous memory addresses to be displayed; and means for incrementing the memory address counter in timed relation to the generation of a display on the display device.

2. A display processor, comprising: a digital, program controllable, numerical processor; a display device; means for repeatedly generating a raster of scans of the display device; a random access memory connected to the digital processor and to the display device; a memory address counter connected to the memory and operative to specify the address of a memory location the contents of which are to be provided to the display device; a control program for the digital processor operative to define a plurality of operations to be performed by the processor including the operation of loading into the memory address counter the initial memory address of the first of a series of character codes stored in contiguous memory addresses to be displayed; means for incrementing the memory address counter in timed relation to the generation of a display on the display device; and means for inhibiting processing activity of the digital processor until the memory has outputted said entire set of contiguous character codes.

3. The display processor of claim 1 wherein said sets of contiguous character codes define one row of characters across the display.

4. The display processor of claim 1 including a character generator operative to receive a single character code at a time from the random access memory and to generate a sequence of luminance control signal for the display.

5. The display processor of claim 1 including a clock connected to the digital processor to provide timing signals for the processor; and a divider chain, connected to the clock, and operative to provide timing signals to the display device, whereby the display is generated in timed relation to the operation of the digital processor.

6. The display processor of claim 2, including means for generating a signal when the display raster reaches the point at which a new display row is to begin; means for generating a signal indicative of the absence of the initial memory address of a series of character codes in the memory address counter; and means conditioned by said previous two signals for inhibiting the generation of luminance control signals for the display for the balance of the display raster.

7. The display processor of claim 4, wherein said means for inhibiting processing activity of the digital processor until the memory has outputted said entire set of contiguous character codes comprises a bi-stable device operative to inhibit processing activity of the digital processor when in a first state and to inhibit the generation of luminance control signals for the display when in the second state; means for placing said bi-stable device in its first state at the end of a display frame, and means for switching said bi-stable device to its second state when the display reaches the point at which a new row is to begin if the digital processor has not loaded the memory address counter with the initial memory address of the first character of such new row of the display.

8. A display processor, comprising: a digital, program controllable, numerical processor; a display device; a random access memory connected to the digital processor and to the display device; a chain of dividing counters operative to provide timing signals to the display device to cause it to repeatedly generate raster scans; a clock connected to the digital processor and the divider chain operative to cause the digital processor to operate in synchronism with the generation of raster scans of the display device; means, controlled by said digital processor, for causing the generation of a predetermined sequence of characters, stored in said random access memory, on the display device; and means for inhibiting processing activity of the digital processor during the generation of said sequence of characters on the display.

9. The display processor of claim 8 wherein said means, controlled by said digital processor, for causing the generation of a predetermined sequence of characters stored in the memory on the display includes a memory address counter, means for incrementing the memory address counter in timed relation to the generation of the display, and means controlled by the digital processor for loading the memory address of the initial character codes of a series of character codes stored in contiguous memory addresses in the memory address counter.

10. A display processor, comprising: a digital, program controllable numerical processor; a display device; a random access memory connected to the processing unit and to the display device, the memory storing a plurality of sets of character codes each comprising one segment of the display, with the codes forming each set stored in contiguous sections of the memory; a memory address counter connected to the memory and operative to specify the address of the memory section which is to be generated on the display; a control program for the digital processor operative to define a plurality of operations to be performed by the processor including the operation of loading the initial memory address of one of said sets of character codes in the memory address counter; means for incrementing the memory address counter in timed relation to the generation of a display on the display device; and means for inhibiting processing activity of the digital processor until the memory has outputted said entire set of character codes.

11. The display processor of claim 10 including a divider chain operative to provide timing signals to the display device to cause it to repeatedly generate raster scans; and a clock connected to the divider chain and to the digital processor to cause operation of the digital processor synchronously with the generation of displays.

12. The display processor of claim 10 wherein said means for inhibiting processing activity of the display processor until the memory has outputted said entire set of character codes includes a bi-stable device.

* * * * *